Sept. 13, 1955  R. O. SEKKI  2,717,454
PIPE LAYOUT GAUGE
Filed Sept. 15, 1953  2 Sheets-Sheet 1
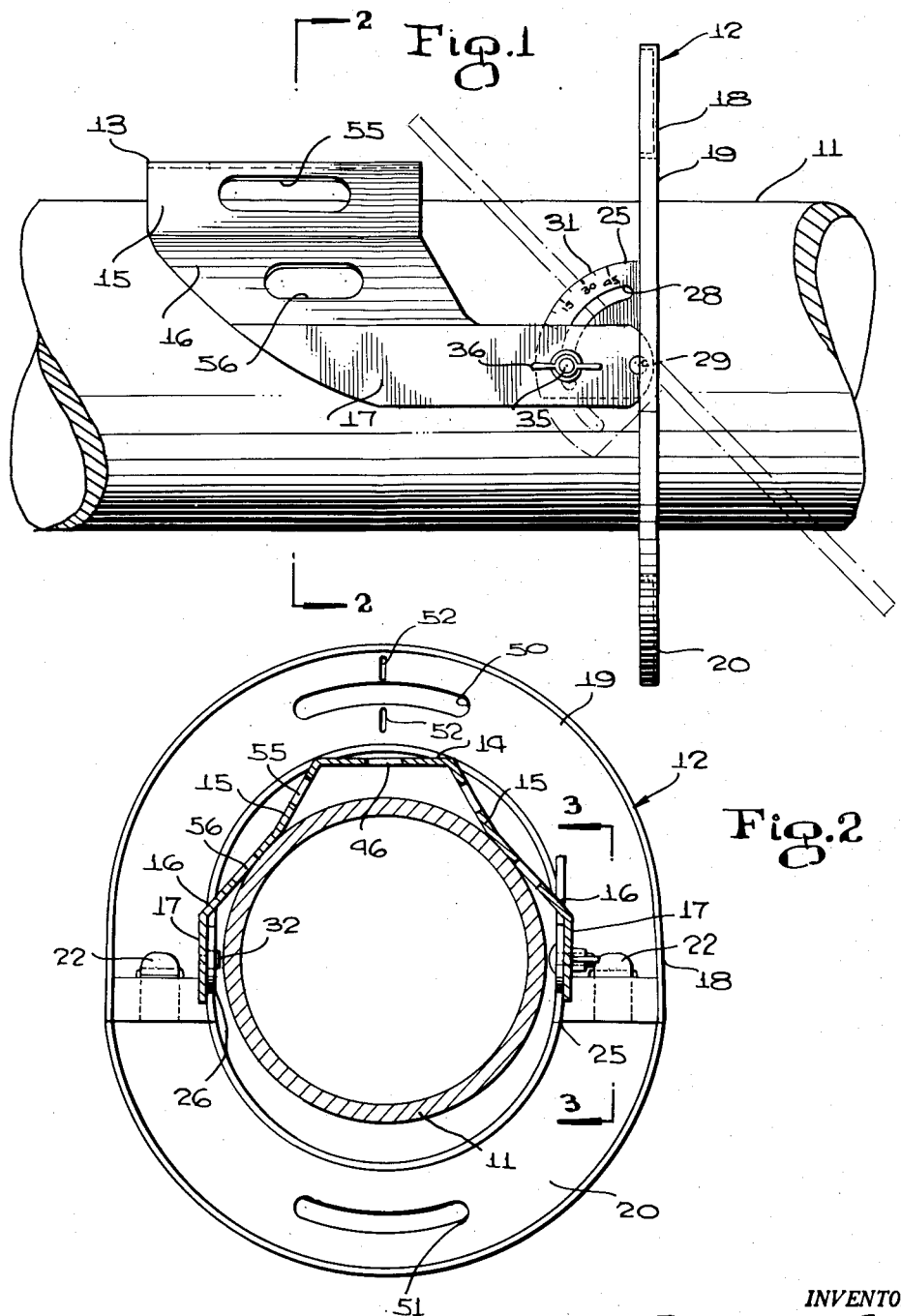
INVENTOR.
RUDOLPH O. SEKKI
BY
McMorrow, Berman & Davidson
ATTORNEYS

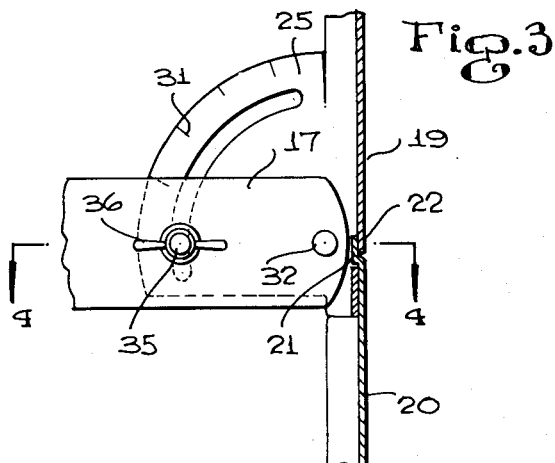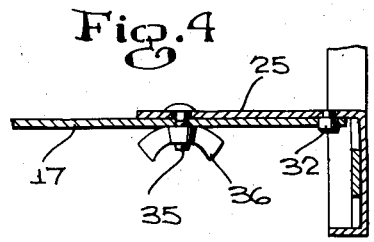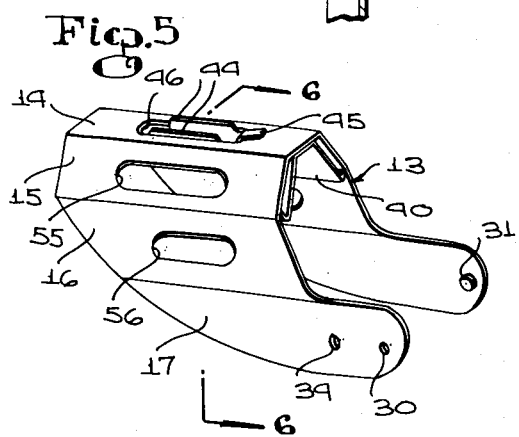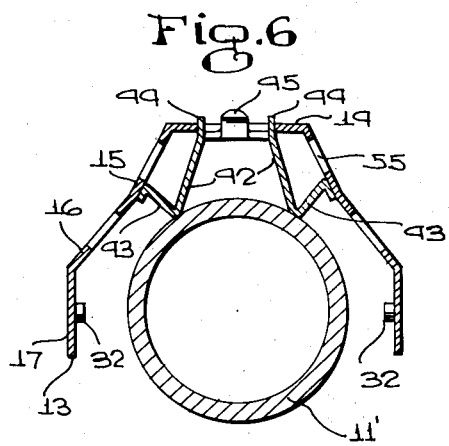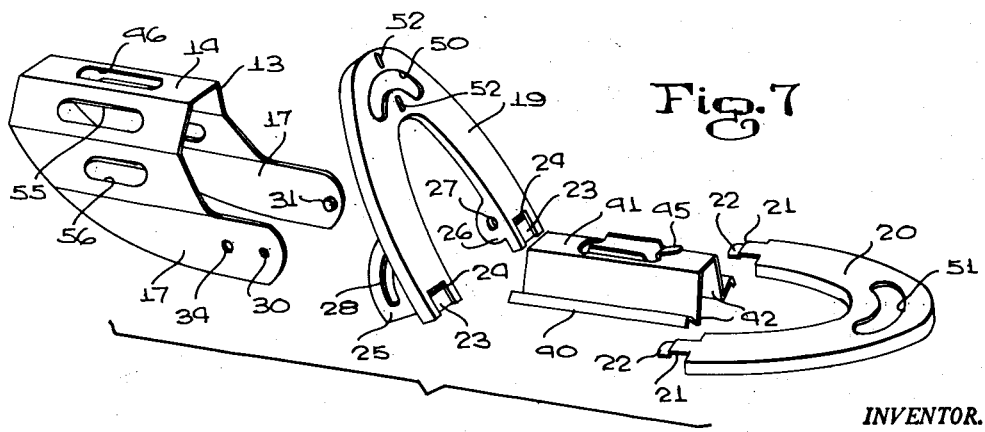

United States Patent Office 2,717,454
Patented Sept. 13, 1955

2,717,454

PIPE LAYOUT GAUGE

Rudolph O. Sekki, Fairport Harbor, Ohio

Application September 15, 1953, Serial No. 380,221

1 Claim. (Cl. 33—174)

This invention relates to pipe layout gauges, and more particularly to an improved portable gauge which may be mounted on a pipe to provide guide means for scribing a cutting line on the pipe at a predetermined angle to the longitudinal center line of the pipe.

The main object of the invention is to provide a novel and improved portable gauge assembly which is simple in construction, which is easy to set up for use on a pipe, and which can be conveniently carried in a mechanic's tool box.

A further object of the invention is to provide an improved pipe layout gauge device which is inexpensive to manufacture, which is rugged in construction, and which can be conveniently set up for use on a pipe without the necessity of disconnecting or removing the pipe, said gauge device being arranged so that it can be set for various angles to provide a reliable guide means for scribing a line around the pipe so that the pipe can be cut obliquely at a desired angle to its longitudinal center line.

Further objects and advantages of the invention will become apparent from the following description and claim, and from the accompanying drawings, wherein:

Figure 1 is a side elevational view of a fragmentary portion of a pipe on which is mounted an improved pipe layout gauge device constructed in accordance with the present invention.

Figure 2 is a transverse vertical cross sectional view taken on the line 2—2 of Figure 1.

Figure 3 is a vertical cross sectional detail view taken on the line 3—3 of Figure 2.

Figure 4 is a cross sectional view taken on the line 4—4 of Figure 3.

Figure 5 is a perspective view of the main support member employed in the gauge device of Figures 1 to 4, said main support member being provided with a filler member nestingly engaged therein for use on a pipe of lesser diameter than the pipe illustrated in Figures 1 and 2.

Figure 6 is a transverse vertical cross sectional view taken through the elements shown in Figure 5 and taken through a pipe supporting said elements.

Figure 7 is a perspective view showing the gauge device as employed on a smaller pipe, as in Figure 6, the components of the gauge device being shown in separated positions.

Referring to the drawings, and more particularly to Figures 1 to 4, 11 designates a pipe which is to be scribed for the purpose of making an oblique cut thereon. Designated generally at 12 is a gauge device according to the present invention, said gauge device comprising a generally channel-shaped support member 13 having a concave bottom surface and adapted to be mounted on a pipe 11 in the manner illustrated in Figures 1 and 2. As shown in Figures 1 and 2, the channel-shaped support member 13 comprises a flat top wall 14, respective downwardly inclined side wall elements 15, 15, respective outwardly and downwardly inclined lower side wall elements 16, 16 bent outwardly from the lower portions of the upper side wall elements 15, 15, and respective forwardly extending, parallel, vertical arm portions 17, 17, the arm portions 17, 17 projecting forwardly a substantial distance from the forward edges of the wall elements 14, 15 and 16.

As shown in Figure 2, the channel-shaped support member 13 is adapted to engage on the cylindrical surface of a pipe 11 substantially at the bends between the respective side wall elements 15 and 16.

Designated generally at 18 is a flat elliptical ring member adapted to surround the pipe 11 and being pivotally connected to the arms 17, 17 for angular adjustment around a transverse axis extending between said arms. The elliptical ring member 18 comprises an upper flat U-shaped segment 19 and a lower flat U-shaped segment 20, the lower segment 20 being formed at its ends with the stepped lugs 21, 21 having the offset end portions 22, 22. The segment 19 is formed at its ends with the recesses 23, 23 adapted to receive the stepped lugs 21, 21, said recesses being slotted at 24, 24 to receive the offset lugs 22, 22, whereby the segment 20 may be lockingly engaged with the segment 19 and whereby the segment 20 will be supported in a coplanar relationship with respect to the segment 19 when the segment 20 is interlocked with the segment 19.

The end portions of the segment 19 are formed with respective plate elements 25 and 26, the plate element 26 being generally circular in shape and being formed with a central aperture 27 and the plate element 25 being relatively large as compared with the plate element 26 and being formed with an arcuate slot 28 concentric with an aperture 29 transversely aligned with the aperture 27. As shown in Figure 2, the plate elements 26 and 25 extend parallel to each other and normal to the plane of the segment 19.

The segment 19 is pivotally connected to the ends of the arms 17, 17 at apertures 30 and 31 which are registered with the apertures 29 and 27 and through which are engaged suitable pivot pins. For example, pivot pins 32 may be secured in the apertures 30, said pivot pins extending inwardly and being pivotally received in the respective apertures 29 and 27, whereby the segment 19 is rotatably connected to the end portions of the arms 17, 17. The arcuate plate member 25 is provided with a protractor scale 33 at its edge portion, as shown in Figure 1, whereby the angular position of the ring segment 19 may be noted by observing the location of the top edge of the adjacent arm 17 relative to the protractor scale 31. Extending through an aperture 34 and the arcuate slot 28 is a bolt 35 provided with a wing nut 36 for clamping the ring segment 19 in an angularly adjusted position relative to the support member 13. Thus, with the ring segment 20 lockingly engaged with the ring segment 19 around a pipe 11, the pipe-surrounding elliptical ring 18 may be adjusted to a desired angular position and clamped in said position, whereby the pipe 11 may be scribed for a desired oblique cut.

After the pipe has been scribed, the device may be readily removed by first disengaging the lower ring segment 20 from the upper ring segment 19, allowing the device to be removed from the pipe. Conversely, when the gauge device is to be used, the upper portion thereof is first placed on the pipe, said upper portion including the upper ring segment 19, whereupon the lower ring segment 20 may be lockingly engaged with the lower portions of the arms of the upper ring segment 19 in the manner above described.

When the device is to be employed for marking a smaller pipe, such as the pipe 11' in Figure 6, a generally channel-shaped filler member 40 is employed, said filler member having the top wall 41, the respective downwardly flaring longitudinal side walls 42, 42, and the upwardly bent flanges 43, 43 at the lower edges of the side walls 42. As shown in Figure 6, the top wall 41 of the filler member is formed with the parallel upstanding, longitudinally extending lug elements 44, 44 at the opposite sides of said top wall and with the hook flange 45 located between and forwardly adjacent the forward ends of the lugs 44, 44, whereby the lugs 44, 44 and the hook flange 45 may be engaged through a longitudinal slot 46 formed in the top wall 14 of the main support member 13. Thus, the filler member 40 is received within the main support member 13 with the lugs 44, 44 engaged against the side edges of the slot 46 and with the hook flange 45 engaging the forward edge portion of the slot, the ends of the flanges 43, 43 being disposed against the under surface of the main support member 13 adjacent the bends between the side wall elements 15 and 16, as shown in Figure 6. The knee portions of the walls 42, 42, namely, the bends between the walls 42 and the flanges 43 engage the cylindrical surface of the pipe 11' and support the main body 13 in a position wherein the pivot pins 32 are aligned with a diameter of the pipe 11', as is clearly shown in Figure 6. Thus, the elliptical ring 18 is supported for rotation around a diameter of the pipe, whereby a desired angular cut may be scribed on the pipe by following the procedure above described.

The ring segments 19 and 20 are formed at their bight portions with respective arcuate slots 50 and 51 to enable the user to view through the slots. The bight portion of the ring segment 19 is further formed with the aligned vertical slots 52, 52 arranged above and below the arcuate slot 50 to enable the user to sight through the slot 50 and the slots 52, 52 along a longitudinal reference line marked on the pipe to enable the device to be properly aligned longitudinally on the pipe prior to scribing the pipe for an angular cut.

The walls 15 and 16 of the main support member are formed with slots 55 and 56 to provide finger grips for holding said support member, as well as to lighten the device and to provide means for hanging the device on a nail, hook or similar support.

While a specific embodiment of an improved pipe layout gauge has been disclosed in the foregoing description, it will be understood that various modifications within the spirit of the invention may occur to those skilled in the art. Therefore, it is intended that no limitations be placed on the invention except as defined by the scope of the appended claim.

What is claimed is:

A pipe layout gauge comprising a support member having a slotted top wall and downwardly inclined side walls for engaging a pipe to be marked, said sides terminating in a pair of depending arms extending forwardly parallel to each other from the opposite sides of said support substantially coplanar with the longitudinal center line of the pipe member, a pipe-surrounding member pivotally mounted between said arms and arranged to define a scribing guide, a protractor scale on said pipe-surrounding member adjacent one of said arms, means for locking said pipe-surrounding member in an angularly adjusted position relative to said arms, said pipe-surrounding member comprising a pair of flat U-shaped ring segments and interlocking means at the ends of said segments arranged to detachably secure said segments together to define a generally elliptical flat ring, said protractor scale being secured on a leg of one of said ring segments and, a generally channel-shaped filler member situated between said side walls and lockingly engaged in the slot on said top wall.

References Cited in the file of this patent

UNITED STATES PATENTS

| | | |
|---|---|---|
| 1,698,154 | Day | Jan. 8, 1929 |
| 1,852,412 | Hickey | Apr. 5, 1932 |
| 1,860,653 | Brown | May 31, 1932 |
| 2,334,422 | Lehnus | Nov. 16, 1943 |
| 2,464,901 | Sturm | Mar. 22, 1949 |
| 2,607,126 | Sekki | Aug. 19, 1952 |
| 2,611,183 | Thrower | Sept. 23, 1952 |